B. CLARK.
FASTENER MOUNTING.
APPLICATION FILED OCT. 2, 1919.

1,358,520.

Patented Nov. 9, 1920.

WITNESSES

INVENTOR
BERTHA CLARK
BY
ATTORNEYS

UNITED STATES PATENT OFFICE.

BERTHA CLARK, OF NEW YORK, N. Y.

FASTENER-MOUNTING.

1,358,520.  Specification of Letters Patent.  Patented Nov. 9, 1920.

Application filed October 2, 1919. Serial No. 328,005.

*To all whom it may concern:*

Be it known that I, BERTHA CLARK, a citizen of the United States, and a resident of the city of New York, borough of Brooklyn, in the county of Kings and State of New York, have invented a new and Improved Fastener-Mounting, of which the following is a full, clear, and exact description.

The invention relates to snap fasteners of the stud and socket type, and its object is to provide a new and improved fastener mounting arranged to support the fasteners in sets to permit a dressmaker or other user of the fasteners to readily sew the fasteners in spaced relation to the garment or other article on which the fastener is to be used to fasten two parts together.

Another object is to allow the user to readily separate the stud and socket members of a fastener without the use and breaking of finger nails.

Another object is to prevent the user from losing one or the other of the fastener members after the same are separated.

Another object is to facilitate the accurate spacing of the members of the parts to be fastened together prior to sewing the members in position.

Another object is to require no change in the construction of the stud and socket members.

With these and other objects in view, the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 1:
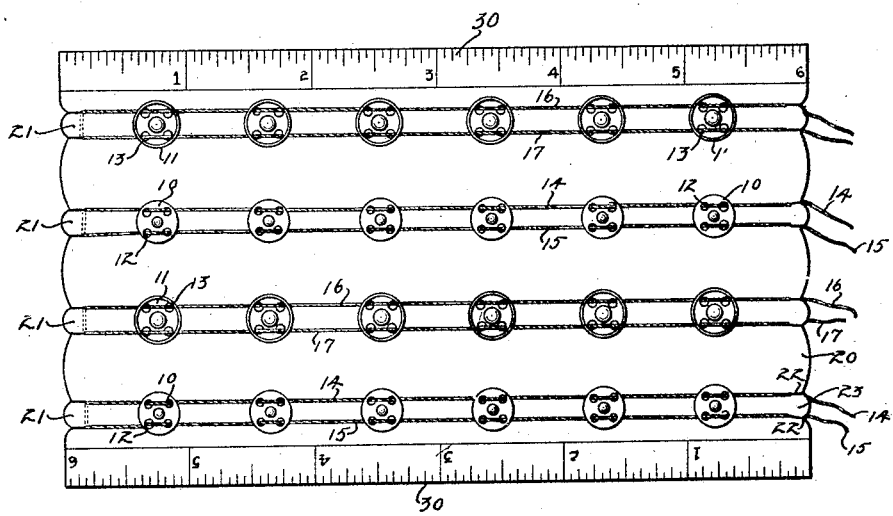
Figure 1 is a face view of the improved fastener mounting with the stud and socket members separately mounted.

Snap fasteners of the stud and socket type are usually mounted on a card with the stud members on one side and with the studs penetrating the card and engaging the socket members held on the other side of the card. This mounting requires separation of the stud and socket members for detachment from the card to permit of sewing the stud and socket members singly to the corresponding parts to be fastened together. In separating the stud and socket members the user usually uses the finger nail, which is liable to be broken by the operation, and after the members are separated one or the other or both are liable to slip out of the user's hands and be lost especially when using fasteners of small sizes. With my improvement presently to be described in detail, the above mentioned objectionable conditions are completely overcome.

The stud members 10 and the socket members 11 are of usual construction and are provided with sewing holes 12 and 13 for the passage of the stitches used for attaching said members to the parts to be fastened together by the snap fasteners. The sewing holes 12 and 13 are usually four in number on each member and through two of such holes 12 of the stud member is threaded a flexible carrier 14 and through the other two holes 12 is threaded another flexible carrier 15. Similar flexible carriers 16 and 17 are threaded through the sewing holes 13 of the socket members 11. By the arrangement described the stud and socket members 10 and 11 are slidably mounted in spaced relation on their respective carriers 14, 15 and 16, 17. In practice, a dozen stud members 10 and a dozen socket members 11 are mounted by the use of the carriers 14, 15 and 16, 17 on a single support 20, such as a card or the like.

The flexible carriers 14, 15 and 16, 17 are preferably in the form of strings, one string for each set of stud members and another string for each set of socket members, the string being doubled up to provide the corresponding flexible carriers 14, 15 and 16, 17. The doubled-up end of each string is engaged with a tongue 21 formed on one end of the support 20, and the free ends of each string are engaged with slots 22 formed in the other end of the support 20, the said slots providing a clamping tongue 23 to hold the ends of the string in position. By the arrangement described the flexible carriers 14, 15 and 16, 17 are stretched over the face of the card in spaced relation, as will be readily understood by reference to Fig. 1.

When it is desired to use the snap fasteners the user removes the corresponding string from the card and then applies the corresponding stud and socket members 10 and 11 to the part of a garment or other article, and by shifting the corresponding members on their carriers, the members are spaced the desired distance apart and are sewed to the part by the usual sewing threads passed through the holes 12 or 13. By the arrangement described the stud and socket members of a pair can be located in accurate relation on the parts to be fastened together to allow of readily engaging a stud member with the corresponding socket member. In order to aid the user to properly space the stud and socket members 10 and 11 apart on their carriers prior to sewing the same in position, use is made of a linear scale 30 formed on each side of the support 20.

Figure 2:
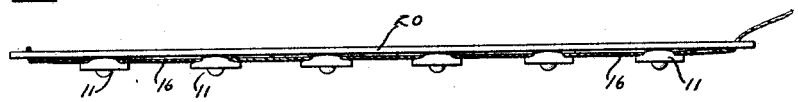
Fig. 2 is an edge view of the same.
Figure 3:
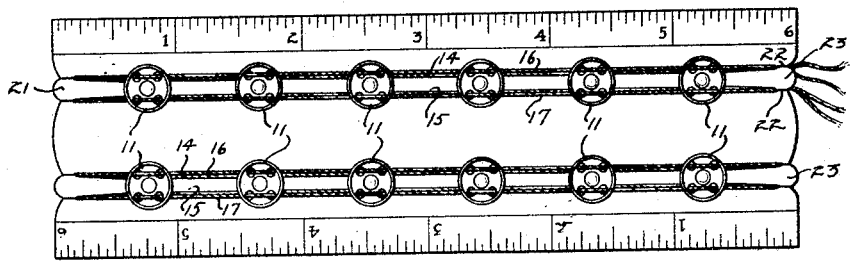
Fig. 3 is a face view of the improved fastener mounting with the studs and socket members fastened together and mounted in pairs.
Figure 4:
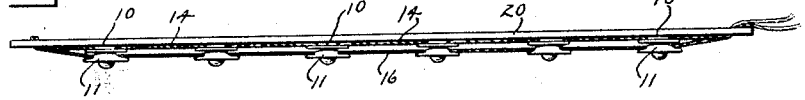
Fig. 4 is an edge view of the same.

Instead of mounting the stud and socket members on their carriers in spaced relation, the stud and socket members may be snapped in place with the corresponding flexible carriers 14, 15 and 16, 17 in superposed position, as indicated in Figs. 3 and 4, but it is understood that the construction of the mounting is otherwise exactly the same as above described with reference to Figs. 1 and 2. As shown in Fig. 4, the stud members 10 overlie the support 20 while the socket members are snapped in position on the stud members 10 and hence overlie the same.

The mounting shown and described is very simple in construction and the fastener members can be readily placed in position on the parts to be fastened together, and after the members are sewed in place the flexible carriers 14, 15 and 16, 17 may be cut and pulled out of the corresponding sewing holes 12 and 13.

It is further understood that a string of fasteners can be readily removed from the card or other support 20, and in case the stud and socket members are fastened together, as shown in Figs. 3 and 4, then they can be readily separated by the operator exerting pulls on the flexible members 14, 15 and 16, 17 in opposite directions to pull the socket members out of the stud members.

It will further be noticed that by the arrangement described, the fastener members are not liable to become lost on separating the same, and the fastener members may be spaced accurately apart on the part on which they are to be sewed in place.

It will also be noticed that no change is required in the construction of the stud and socket members.

Having thus described my invention, I claim as new and desire to secure by Letters Patent:—

A snap fastened mounting, comprising two pairs of approximately parallel strings, of which the strings of one pair are adapted to be threaded in spaced relation through the corresponding pairs of sewing apertures of one of the members of a snap fastener, and the parallel strings of the other pair are adapted to be threaded in spaced relation through the corresponding pairs of sewing apertures of the other member of the snap fastener, and a support provided on its ends with retaining means engaged by the ends of the said strings to hold the latter stretched on the support and to hold the stud member and the socket member seated on the support.

BERTHA CLARK.